US012654730B2

(12) United States Patent
Park et al.

(10) Patent No.: US 12,654,730 B2
(45) Date of Patent: Jun. 16, 2026

(54) AUTONOMOUS VEHICLE AND OPERATING METHOD THEREOF

(71) Applicants: Hyundai Motor Company, Seoul (KR); Kia Corporation, Seoul (KR)

(72) Inventors: Jong Sung Park, Hwaseong-Si (KR); Young Bin Min, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/817,535

(22) Filed: Aug. 28, 2024

(65) Prior Publication Data

US 2025/0074448 A1 Mar. 6, 2025

(30) Foreign Application Priority Data

| | | |
|---|---|---|
| Aug. 28, 2023 | (KR) | 10-2023-0112532 |
| Aug. 6, 2024 | (KR) | 10-2024-0104459 |

(51) Int. Cl.
| | |
|---|---|
| *B60W 50/14* | (2020.01) |
| *B60W 30/09* | (2012.01) |
| *B60W 40/08* | (2012.01) |
| *B60W 60/00* | (2020.01) |

(52) U.S. Cl.
CPC ............ *B60W 50/14* (2013.01); *B60W 30/09* (2013.01); *B60W 40/08* (2013.01); *B60W 60/0053* (2020.02); *B60W 60/0057* (2020.02); *B60W 60/0059* (2020.02); *B60W 2040/0827* (2013.01); *B60W 2050/146* (2013.01); *B60W 2540/225* (2020.02); *B60W 2540/229* (2020.02)

(58) Field of Classification Search
CPC ...... B60W 50/14; B60W 30/09; B60W 40/08; B60W 60/0053; B60W 60/0057; B60W 60/0059; B60W 2040/0827; B60W 2050/146; B60W 2540/225; B60W 2540/229; B60W 2050/143; B60W 60/001; B60W 50/16; B60W 2420/403; B60W 2420/408; B60W 2420/54; B60W 2540/24; B60W 2552/00; B60W 2554/00; B60W 2556/50; B60K 35/28; B60N 2/0276; B60Y 2302/05
See application file for complete search history.

(56) References Cited

U.S. PATENT DOCUMENTS

| | | | |
|---|---|---|---|
| 2017/0205823 A1 | 7/2017 | Arndt et al. | |
| 2018/0329414 A1* | 11/2018 | Igarashi | B60W 50/082 |
| 2019/0315376 A1 | 10/2019 | Seo et al. | |

OTHER PUBLICATIONS

Jan. 24, 2025—(EP) European Search Report—App. 24196917.9.

* cited by examiner

*Primary Examiner* — Thomas S McCormack
(74) *Attorney, Agent, or Firm* — Banner & Witcoff, Ltd.

(57) ABSTRACT

A method may provide a notification for handover of driving control from the autonomous driving system to the user. The method includes determining whether the control of the vehicle needs to be handed over to a user based on an event occurring during autonomous driving of the vehicle, and providing the user with a notification indicating that the control of the vehicle needs to be handed over to the user.

20 Claims, 4 Drawing Sheets

AUTONOMOUS VEHICLE AND OPERATING METHOD THEREOF

CROSS REFERENCE TO RELATED APPLICATIONS

The present application claims priority to Korean Patent Applications No. 10-2023-0112532, filed Aug. 28, 2023, and 10-2024-0104459, filed Aug. 6, 2024, the entire contents of which is incorporated herein by reference for all purposes.

TECHNICAL FIELD

This document relates to an autonomous vehicle and operating method thereof, and more particularly, to a method for providing an alarm for handover of driving control from the autonomous driving system to the user (e.g., in a Level 4 autonomous vehicle).

BACKGROUND

The Society of Automotive Engineers (SAE) categorizes the maturity of vehicle autonomous driving technology into industry standard levels ranging from 0 to 5. Among these, Level 4 autonomous driving technology, referred to as high automation, is characterized by the automated driving system being fully responsible for vehicle operation within a specific operational design domain (ODD) without user or driver intervention.

Level 4 autonomous systems may monitor the driving environment and vehicle state in real-time, can perform all driving functions under everyday routes or predefined conditions, and may not require user intervention in driving.

However, in certain environments, such as heavy snowfall, or when the vehicle operates outside its ODD, the Level 4 autonomous system may need to transfer the dynamic driving task (DDT) to the user.

Level 4 autonomous driving technology is also referred to as the "Mind off" level because it should not require the user's attention, allowing the user of a Level 4 autonomous vehicle to rely on the autonomous driving system for vehicle operation and engage in a variety of non-driving-related activities. Due to this, even when the autonomous system requests control handover through alarms, the user may need significant time to take over control.

Autonomous systems may have a limited and standardized set of predefined request-to-intervene (RTI) scenarios, and their responses may also be uniform. Furthermore, since Level 4 autonomous systems have not yet been commercialized, there is no established definition for when and how to request control handover in Level 4 autonomous systems.

The matters described in this Background section are only for enhancement of understanding of the background of the disclosure, and should not be taken as acknowledgement that they correspond to prior art already known to those skilled in the art.

SUMMARY

Various features described in this document aim to provide a method for requesting the handover of driving control from the autonomous driving system to the user, based on a user monitoring system, considering the characteristics of an autonomous driving system (e.g., a Level 4 autonomous driving system or other autonomous driving systems).

Various features described in this document also aim to define the various conditions under which a request for the handover of driving control should be made in an autonomous driving system (e.g., a Level 4 autonomous driving system or other autonomous driving systems).

The technical objects of this document are not limited to the aforesaid, and other objects not described herein with can be clearly understood by those skilled in the art from the descriptions below.

A vehicle equipped with autonomous driving capabilities may comprise at least one sensor configured to detect external environment of the vehicle, a state of the vehicle, and a state of a user; a processor configured to execute autonomous driving of the vehicle based on information obtained via the at least one sensor; and a controller configured to control, based on a control of the processor, an operation of the vehicle, wherein the processor is configured to: determine whether control of the vehicle needs to be handed over to the user based on an event occurring during autonomous driving of the vehicle, generate, based on the state of the user and based on an indication associated with urgency of the event, a notification indicating that the control of the vehicle needs to be handed over to the user, and output the generated notification to the user.

The processor may be further configured to: detect the event, determine whether the control of the vehicle needs to be handed over based on the event, determine an event occurrence remaining time until the event occurs, determine whether the event occurrence remaining time is greater than or equal to a first time, determine whether the event occurrence remaining time is greater than a second time, based on the event occurrence remaining time being greater than or equal to the first time, and continue autonomous driving, based on the event occurrence remaining time being greater than the second time, or display a first-stage notification for control handover request, based on the event occurrence remaining time being less than the second time, wherein the second time is determined based on at least one of the state of the user or the state of the vehicle.

The second time may be determined by adding, to the first time, a vehicle state change time needed to bring the vehicle to a state where the user is able to drive the vehicle based on the state of the vehicle and a buffer time required for the user to perform a driving operation based on the state of the user.

The state of the user may be determined based on gaze information and information on whether the user is asleep, and wherein the state of the vehicle is based on at least one of state information of a driver seat of the vehicle or state information of a driving operation interface.

The buffer time may be configured to increase as user's gaze deviates further from a forward direction, and the vehicle state change time may be configured to increase as the driver seat or the driving operation interface deviates more from a normal state allowing the user to drive the vehicle.

The processor may be configured to execute, based on the event occurrence remaining time being less than the first time, a minimal risk maneuver to transition the vehicle to a minimal risk condition state.

The processor may be further configured to: determine, based on the event occurrence remaining time being less than the first time, a value indicating a driving risk level of the vehicle, move, based on the driving risk level being less than a risk threshold, a driver seat of the vehicle to a state preset by the user, and move, based on the driving risk level being greater than the risk threshold, the driver seat to a state capable of protecting the user from a collision.

The processor may be configured to: display a second-stage notification for control handover request based on the event occurrence remaining time being less than a third time, and display a third-stage notification for control handover request based on the event occurrence remaining time being less than a fourth time, wherein the first time and the fourth time are the same, the third time is longer than the fourth time, and the second time is longer than the third time.

The first time and the fourth time may be minimum expected time required for the user to recognize a current state of the vehicle and surrounding traffic and be able to manually drive the vehicle, and the third time may be the time obtained by subtracting the buffer time from the second time.

The processor may be configured to move a driver seat of the vehicle to a state preset by the user while displaying the second-stage notification.

The vehicle state change time may comprise at least one of: a seat adjustment time required to adjust the driver seat from an altered state in which the user was not engaged in driving to a state that allows the user to drive, or an operation interface adjustment time required to adjust the operation interface to a state that allows the user to use.

One or more methods may be performed by an apparatus of the vehicle. The one or more methods may perform one or more operations described herein.

DETAILED DESCRIPTION

Figure 1:
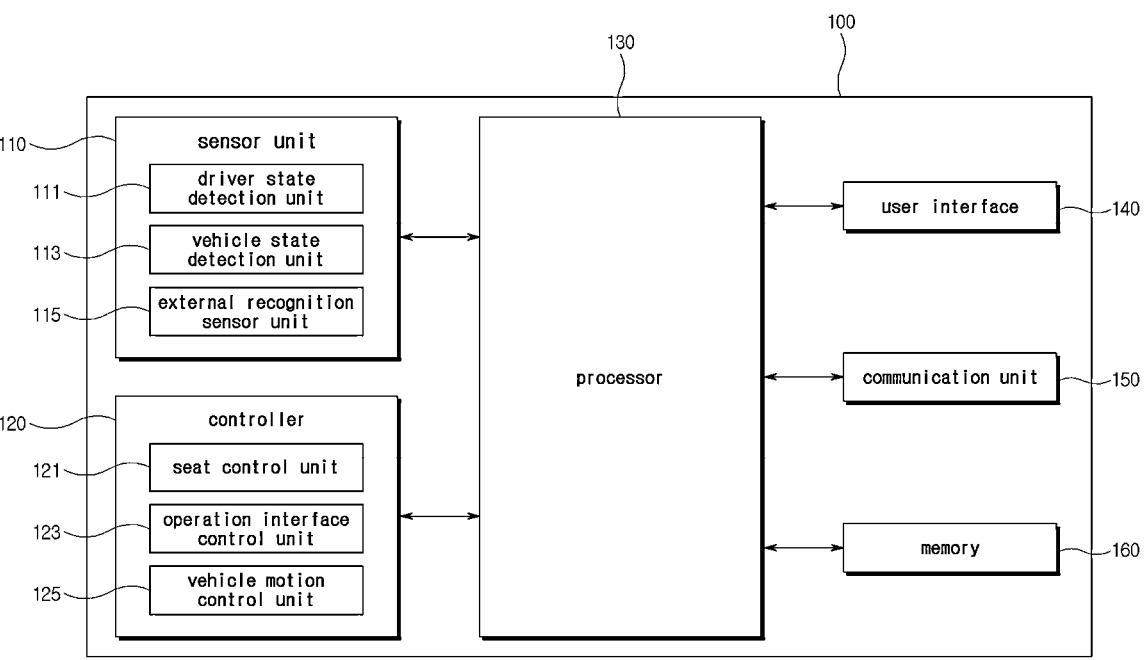
FIG. 1 is a block diagram of a vehicle.

Hereinafter, various examples of this document will be described in detail with reference to the accompanying drawings.

The organization of this disclosure and its operational effects will be readily apparent from the detailed explanations provided below, facilitating a clear understanding. Before the detailed explanation in this document, it should be noted that the same reference numeral will be used for the same component whenever possible, even if displayed on different drawings, and that detailed descriptions of well-known components will be omitted to avoid obscuring the subject matter of this disclosure.

Before proceeding with the detailed explanation in this document, one or more terms used herein may be described as follows.

A vehicle may be an autonomous vehicle equipped with an autonomous driving function. An autonomous vehicle refers to one equipped with an automated driving system (ADS) capable of autonomous driving. An operation control for autonomous driving of a vehicle may comprise acceleration, deceleration, steering control, gear shifting control, braking system control, traction control, stability control, cruise control, lane keeping assist control, collision avoidance system control, emergency brake assistance control, traffic sign recognition control, adaptive headlight control, etc. For example, a vehicle may perform at least one of steering, acceleration, deceleration, lane changing, and stopping (or parking) without user intervention by the ADS. The ADS may include, for example, at least one of highly automated motorway chauffeur system (HMCS), pedestrian detection and collision mitigation system (PDCMS), lane change decision aid system (LCDAS), lane departure warning system (LDWS), adaptive cruise control (ACC), lane keeping assistance system (LKAS), road boundary departure prevention system (RBDPS), curve speed warning system (CSWS), forward vehicle collision warning system (FVCWS), and low speed following (LSF).

During autonomous driving of a vehicle, different types of events may be encountered/alerted. The ADS may process a predefined event (e.g., collision detections, lane departure warnings, pedestrian detection, obstacle detections, sudden braking events, speed limit exceedance events, traffic sign recognition events, vehicle-to-everything (V2X) communication events, road condition change detections like detection of hazardous road conditions like ice, oil spills, or potholes, driver monitoring system alerts indicating, for example, the driver showing signs of drowsiness, distraction, or other impairments, sensor malfunction detections, navigation system alerts indicating, for example, detection of an unplanned route change or off-course event, geofencing alerts indicating entering or existing a predefined geographical area, vehicle intrusion detections indicating unauthorized access or intrusion into the vehicle, emergency vehicle detections indicating presence of an emergency vehicle nearby, etc.), and the ADS may be configured to store data associated with the predefined event.

An automation level of an autonomous driving vehicle may be classified as follows, according to the American Society of Automotive Engineers (SAE). At autonomous driving level 0, the SAE classification standard may correspond to "no automation," in which an autonomous driving system is temporarily involved in emergency situations (e.g., automatic emergency braking) and/or provides warnings only (e.g., blind spot warning, lane departure warning, etc.), and a driver is expected to operate the vehicle. At autonomous driving level 1, the SAE classification standard may correspond to "driver assistance," in which the system performs some driving functions (e.g., steering, acceleration, brake, lane centering, adaptive cruise control, etc.) while the driver operates the vehicle in a normal operation section, and the driver is expected to determine an operation state and/or timing of the system, perform other driving functions, and cope with (e.g., resolve) emergency situations. At autonomous driving level 2, the SAE classification standard may correspond to "partial automation," in which the system performs steering, acceleration, and/or braking under the supervision of the driver, and the driver is expected to determine an operation state and/or timing of the system, perform other driving functions, and cope with (e.g., resolve) emergency situations. At autonomous driving level 3, the SAE classification standard may correspond to "conditional automation," in which the system drives the vehicle (e.g., performs driving functions such as steering, acceleration, and/or braking) under limited conditions but transfer driving control to the driver if the required conditions are not met, and the driver is expected to determine an operation state and/or timing of the system, and take over control in emergency situations but do not otherwise operate the vehicle (e.g., steer, accelerate, and/or brake). At autonomous driving level 4, the SAE classification standard may correspond to "high automation," in which the system performs all driving functions, and the driver is expected to take control of the vehicle only in emergency situations. At autonomous driving level 5, the SAE classification standard may correspond to "full automation," in which the system performs full driving functions without any aid from the driver including in emergency situations, and the driver is not expected to perform any driving functions other than determining the operating state of the system. Although the present disclosure may apply the SAE classification standard for autonomous driving classification, other classification methods and/or algorithms may be used in one or more configurations described herein. One or more features associated with autonomous driving control may be activated based on configured autonomous driving control setting(s) (e.g., based on at least one of: an autonomous driving classification, a selection of an autonomous driving level for a vehicle, etc.).

A user may be a human who uses the vehicle and receive services from the autonomous driving system. All occupants of the vehicle may be users, and one of them may be the driver. The autonomous driving system may recognize the user seated in the designated driver's seat as the driver.

Vehicle control authority refers to the authority to control at least one component and/or function of the vehicle. At least one function of the vehicle may include, for example, at least one of steering function, acceleration function, deceleration function (or braking function), lane change function, lane detection function, lateral control function, obstacle detection and distance sensing function, powertrain control function, safe area detection function, engine on/off function, power on/off function, and vehicle locking/unlocking function. The listed vehicle functions are examples provided for illustrative purposes, and the examples of this document are not limited thereto. A controller (e.g., a vehicle controller) of the vehicle may control at least one of the functions described above.

A shoulder may be a space between the outermost road boundary (or outermost lane boundary) and the road edge (e.g., curb, guardrail) in the direction in which the vehicle is driving.

Figure 2:
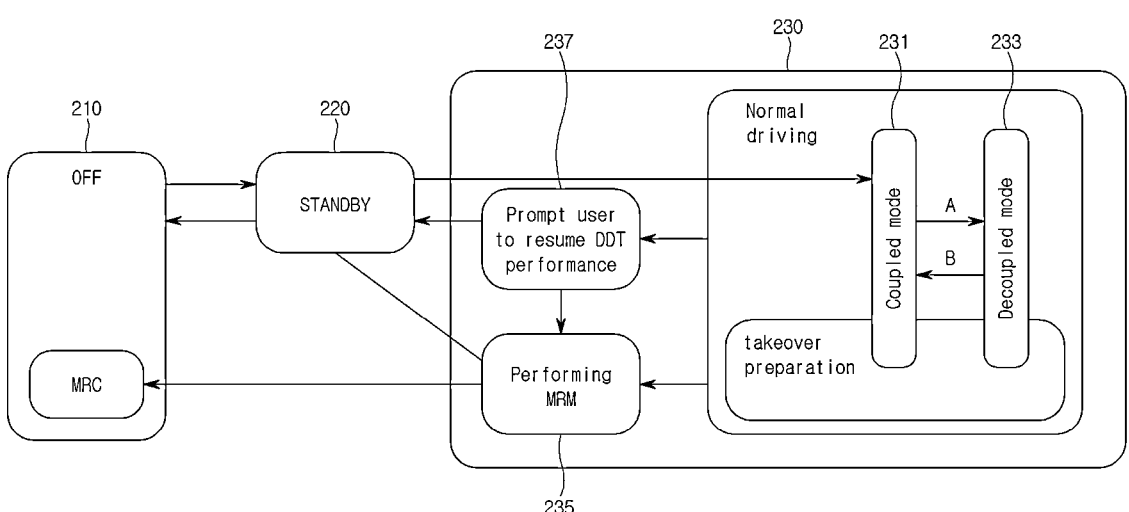
FIG. 2 is a state transition diagram of an example of a highly automated motorway chauffeur system (HMCS), one of Level 4 autonomous driving technologies executed by a processor of a vehicle.

FIG. 1 is a block diagram of a vehicle, and FIG. 2 is a state transition diagram of the HMCS, one of the Level 4 autonomous driving technologies executed by the processor of a vehicle;

The configuration of the vehicle depicted in FIG. 1 is provided as an example, and each component may be configured as one chip, one component, or one electronic circuit, or a combination of chips, components, and/or electronic circuits. In some implementations, some of the components shown in FIG. 1 may be separated into multiple components and configured as different chips, different components, or different electronic circuits, and some components may be combined to be configured as one chip, one component, or one electronic circuit. In some implementations, some components shown in 1 may be omitted, or other components not shown may be added.

With reference to FIG. 1, the vehicle 100 may include a sensor unit 110 (e.g., including one or more sensors), a controller 120, a processor 130, a user interface 140, a communication device 150, and memory 160.

The sensor unit 110 may acquire road information, information about objects around the vehicle (e.g., other vehicles, pedestrians, objects, curbs, guardrails, lanes, obstacles), and/or the vehicle's location information based on sensing data obtained from at least one sensor. Road information may include, for example, lane position, lane shape, lane color, lane type, number of lanes, presence of shoulders, or size of shoulders. Objects around the vehicle may include, for example, the position of objects, the size of objects, the shape of objects, the distance to objects, and/or the relative speed of objects. Road information may include, for example, lanes (e.g., a number and orientation of lanes), traffic lights (e.g., location and status of traffic lights), signs (e.g., location and status of road signs), road conditions (e.g., potholes, bumps, road texture), traffic flow (e.g., traffic density, speeds, patterns), obstacles and hazard information (e.g., construction zones, debris, pedestrians), location of crosswalks and pedestrian paths, layouts of intersections, and/or roadside features (e.g., barriers, guardrails, sidewalks, edges).

The sensor unit 110 may include at least one of a camera, light detection and ranging (LiDAR), radio detection and ranging (RADAR), an ultrasonic sensor, an infrared sensor, and/or a position measurement sensor. The listed sensors are provided as examples for illustrative purposes only, and the sensors included in the sensor unit 110 of this document are not limited thereto. The camera may capture images around the vehicle to generate image data, including lanes and/or surrounding objects in the front, rear, and/or sides of the vehicle 100. The LiDAR may use light (or laser) to generate information about objects located in the front, rear, and/or sides of the vehicle 100. The radar may use electromagnetic waves (or radio waves) to generate information about objects located in the front, rear, and/or sides of the vehicle 100. The ultrasonic sensor may use ultrasonic waves to generate information about objects located in the front, rear, and/or sides of the vehicle 100. The infrared sensor may use infrared to generate information about objects located in the front, rear, and/or sides of the vehicle 100. The position measurement sensor may measure the current position of the vehicle. The position measurement sensor may include at least one of a global positioning system (GPS) sensor, a differential global positioning system (DGPS) sensor, and a global navigation satellite system (GNSS) sensor. The position measurement sensor may generate location data of the vehicle based on signals generated by at least one of the GPS sensor, DGPS sensor, and GNSS sensor.

The sensor unit 110 may include various sub-functional modules, such as a user state detection unit 111, a vehicle state detection unit 113, and an external recognition sensor unit 115. The sub-functional modules may be implemented using one or more software modules and/or hardware components. The sub-functional modules may be implemented by one or more sensors, one or more processors, and/or one or more memories.

The user state detection unit 111 (e.g., a sensor, such as a camera, a motion sensor, a wheel sensor for sensing user's hand contacting the driving wheel, a biometric sensor for identifying characteristics of parts of a human body, etc.) may detect the current status of the user. When there are a plurality of occupants in the vehicle, the user state detection unit 111 may recognize all of occupants as users and monitor their statuses. Additionally or alternatively, the user state detection unit 111 may recognize the user seated in the driver's seat as the driver and monitor the driver's status more closely. For example, the user state detection unit 111 may determine the presence or absence of the user in the driver's seat, detect whether the user is drowsy, and/or assess the level of fatigue the user is experiencing. The user state detection unit 111 may determine the concentration level of the user's current behavior and whether the behavior is acceptable (e.g., determine whether the user is distracted by other events and/or activities). For example, the user state detection unit 111 may determine whether the user is concentrating on reading or playing a game, and whether the user is engaged in acceptable activities within the range that allows for an immediate takeover of driving control of the vehicle. The user state detection unit 111 may also determine whether the user is capable of driving. For example, the user state detection unit 111 may determine whether the user seated in the driver's seat is a licensed driver by identifying the user's biometric characteristics, and may also determine whether the user is intoxicated. In addition, the user state detection unit 111 may also detect the user's physical information (e.g., height, weight, etc.).

The vehicle state detection unit 113 may acquire internal vehicle state information using sensors, etc. For example, the vehicle state detection unit 113 may detect normal operating information and/or fault status information for each component of the vehicle. The vehicle state detection unit 113 may acquire the current status of the driver's seat and the status of the driver's seat before activating the autonomous driving system. The status of the driver's seat may include information such as seat position, seat rotation angle, and seat backrest tilt. The vehicle state detection unit 113 may detect user input related to vehicle motion control, such as steering torque and acceleration or braking pedal inputs.

The external recognition sensor unit 115 may detect operational design domain (ODD) information, such as whether the vehicle is within the ODD and approaching ODD boundaries, and recognize normal operation information and/or fault status information for each sensor. The external recognition sensor unit 115 may provide its own reliability information for the sensor output from the sensor unit 110. For example, the external recognition sensor unit 115 may provide lane detection reliability information (e.g., a reliability value indicating an accuracy of a lane detection result), output variance information, and/or reflected wave intensity.

The controller 120 may control the operation of at least one component of the vehicle 100 and/or at least one function of the vehicle under the control of the processor 130. At least one function may include, for example, steering function, acceleration function or longitudinal acceleration function, deceleration function or longitudinal deceleration function, brake function, lane change function, lane detection function, obstacle detection and distance detection function, lateral control function, powertrain control function, safe area detection function, engine on/off, power on/off, and at least one of locking/unlocking functions of the vehicle.

The controller 120 may control the operation of at least one component and/or at least one function of the vehicle 100 for autonomous driving (e.g., autonomous driving according to HMCS) and/or minimal risk maneuver (MRM) under the control of the processor 130. For example, the controller 120 may control the operation of at least one of the steering function, acceleration function, deceleration function, lane change function, lane detection function, lateral control function, obstacle detection and distance detection function, powertrain control function, and safe area detection function for minimal risk maneuver. MRM may also be referred to as a minimum risk maneuver. A minimal risk maneuvering operation (e.g., a minimal risk maneuver, a minimum risk maneuver) may be a maneuvering operation of a vehicle to minimize (e.g., reduce) a risk of collision with surrounding vehicles in order to reach a lowered (e.g., minimum) risk state. A minimal risk maneuver may be an operation that may be activated during autonomous driving of the vehicle when a driver is unable to respond to a request to intervene. During the minimal risk maneuver, one or more processors of the vehicle may control a driving operation of the vehicle for a set period of time.

The controller 120 may include a seat control unit 121, an operation interface control unit 123, and a vehicle motion control unit 125. The seat control unit 121, operation interface control unit 123, and vehicle motion control unit 125 may perform various tasks to notify the user of control handover (e.g., in a Level 4 autonomous driving system). For example, the seat control unit 121 (e.g., one or more parts of a seat, one or more controllers, one or more processors, one or more motors, one or more sensors, such as tilt sensors, one or more seat adjustment controllers, etc.) may return the driver's seat to the driving position, and the operation interface control unit 123 may control the operation interface to extend such that the user can operate the vehicle.

The vehicle motion control unit 125 (e.g., one or more vehicle controllers, one or more processors, one or more driving control parts of the vehicle, such as one or more motors, one or more sensors, an acceleration pedal, a driving wheel, a braking system, one or more controllers thereof, etc.) may control the vehicle's motion by controlling the vehicle's suspension, etc.

The user interface (UI) 140 may include various devices that provide information related to the vehicle 100 in auditory, visual, and/or tactile manners. For example, the user interface 140 may include haptic devices equipped in the displays, seats, or seatbelts, and speakers providing information through sound. The user interface (UI) 140 may provide the user of the vehicle 100 with various information related to the status of the vehicle 100 under the control of the processor 130. The user interface (UI) 140 may provide various notifications from the autonomous driving system to the user in visual, auditory, and/or tactile manners under the control of the processor 130. The various information related to the status of the vehicle may include at least one of information indicating the normal operation or malfunction of various components included in the vehicle and/or at least one function of the vehicle, and information indicating the driving status of the vehicle.

The communication device 150 may communicate with external devices of the vehicle 100. The communication device 150 may receive data from the outside of the vehicle 100 or transmit data the outside of the vehicle 100 under the control of the processor 130. For example, the communication device 150 may perform communication using wireless or wired communication protocols.

The memory 160 may store autonomous driving programs implemented by the autonomous driving system or the processor 130. The memory 160 may store a program for implementing HMCS, and the processor 130 may read the corresponding program from the memory 160 to implement the HMCS autonomous driving function.

The processor 130 may control the overall operation of the vehicle 100. The processor 130 may include an electrical control unit (ECU) capable of (e.g., integratively) controlling components within the vehicle 100. For example, the processor 130 may include a central processing unit (CPU) or micro controller unit (MCU) capable of performing computational tasks.

The processor 130 may activate automated driving system (ADS) upon occurrence of predetermined events, thereby controlling components within the vehicle 100 to enable autonomous driving. The predetermined events may occur when autonomous driving of the vehicle is requested, for example, if vehicle control authority is delegated by the user, or if conditions specified by the user and/or designer are satisfied.

The processor 130 may determine whether autonomous driving is possible based on at least one of the vehicle state information and/or surrounding environmental information during autonomous driving. In situations where normal autonomous driving is not possible, the processor 130 may control the vehicle to come to a stop by executing a minimum risk maneuver (MRM) operation.

The processor 130 may execute highly automated motor-way chauffeur systems (HMCS), a Level 4 autonomous driving technology, as illustrated in FIG. 2. HMCS is one of the Level 4 autonomous driving technology standards, designed to enable autonomous vehicles to perform the complete dynamic driving task (DDT) on access-controlled highways that meet the operational design domain (ODD) constraints. The DDT may include a set of tactical and operational functions that a driver or the vehicle performs while driving and navigating traffic (e.g., controlling the vehicle's lateral and longitudinal movements based on an identified driving environment). The driving environment may include road markings, road signs, road infrastructure, other vehicles, objects on the road or roadside, and/or other traffic objects. DDTs may include activities such as steering, braking, accelerating, monitoring the vehicle and roadway, and determining when to change lanes, turn, or use signals.

With reference to FIG. 2, the processor 130 may start in the HMCS off state 210. Since HMCS is a Level 4 autonomous driving technology specifically for driving on access-controlled highways, it may remain off and not be activated on regular roads. The processor 130 may remain in the HMCS off state unless the vehicle approaches the operational design domain defined for HMCS.

The processor 130 may transition from the HMCS off state 210 to the HMCS standby state 220 upon recognizing that the vehicle 100 enters a highway (e.g., the vehicle 100 is passing through a highway toll gate entrance), the driving conditions satisfy the ODD defined for HMCS, or based on user input.

The processor 130 may transition from the HMCS standby state 220 to the HMCS active state 230 when predetermined conditions are met. In the HMCS active state 230, the processor 130 may perform autonomous driving according to the methods defined in HMCS.

In the HMCS active state 230, the processor 130 may operate in either the coupled mode 231 or the decoupled mode 233 while carrying out normal vehicle driving operations. The coupled mode 231 may be a mode where user input for a vehicle operation is possible and the user input may affect the vehicle operation. Decoupled mode 233 may be a mode where the user input does not affect the vehicle operation. For example, in decoupled mode 233, even when the user presses the accelerator or brake, the vehicle's operation may not change accordingly. Various methods may be used to implement decoupled mode 233.

While controlling the vehicle normally based on HMCS autonomous driving technology, the processor 130 may operate in either coupled mode 231 or decoupled mode 233, and may switch from coupled mode 231 to decoupled mode 233 when condition A is met, or from decoupled mode 233 to coupled mode 231 when condition B is met.

The processor 130 may automatically transition from coupled mode 231 to decoupled mode 233 without user consent, but may require user approval to switch from decoupled mode 233 to coupled mode 231. For example, the processor 130 may switch from decoupled mode 233 to coupled mode 231 only when a user or one of the users is in a position capable of driving and has approved the transition.

In some implementations, the processor 130 may perform transitions only after obtaining user approval, both when transitioning from coupled mode 231 to decoupled mode 233 and when transitioning from decoupled mode 233 to coupled mode 231.

The processor 130 may provide an alarm to the user regarding the transition when switching from decoupled mode 233 to coupled mode 231 or from coupled mode 231 to decoupled mode 233. If user approval is required for the transition, the processor 130 may display a message requesting approval for the transition using the user interface 140 or by using other components or methods.

In the HMCS active state 230, if the conditions for activating minimal risk maneuver (MRM) are met, the processor 130 may perform MRM as denoted by reference number 235 to bring the vehicle to a minimal risk condition (MRC) state. The MRC state may be a stationary state. In this state, HMCS may transition from the HMCS active state 230 to the HMCS off state 210.

The minimal risk maneuver (MRM) performed by the processor 130 as denoted by reference numeral 235 may be carried out as follows. The following operation may be performed in parallel with the HMCS autonomous driving operation of the processor 130, and when the vehicle is brought to the minimal risk condition (MRC) state due to the MRM execution as denoted by reference number 235, the HMCS may transition from the HMCS active state to the HMCS off state 210.

The processor 130 may determine whether the functions required for autonomous driving are operating normally, based on the vehicle state information. The functions necessary for autonomous driving may include at least one of lane detection, lane change, lateral control, deceleration (or brake control), acceleration control, powertrain control, safe area detection, and obstacle detection and distance sensing. The processor 130 may determine that normal autonomous driving is not possible when at least one of the functions necessary for autonomous driving cannot operate normally.

The processor 130 may determine whether the vehicle state is suitable for normal operating conditions based on the vehicle state information. For example, the processor 130 may determine whether the mechanical status information of the vehicle (e.g., tire pressure information or engine over-heating information) meets the requirements of normal operating conditions. Upon detecting that the status of the vehicle does not meet the requirements of normal operating conditions, the processor 130 may determine that normal autonomous driving is not available (e.g., impossible). For example, when it is found that the vehicle cannot operate normally due to tire pressure issues or engine overheating, the processor 130 may determine that normal autonomous driving is not possible.

The processor 130 may determine whether the surrounding environment of the vehicle is suitable for the basic operational design domain of autonomous driving based on at least part of surrounding environment information. The operational design domain represents the conditions under which autonomous driving operates effectively. Upon detecting that the surrounding environmental information does not meet the operational design domain, the processor 130 may determine that normal autonomous driving is not available (e.g., impossible).

If normal autonomous driving is not possible, the processor 130 may determine that a minimal risk maneuver is required to minimize the risk of an accident. When a minimal risk maneuver is needed, the processor 130 may select one of a plurality of minimal risk maneuver strategies and execute the maneuver. For example, the minimal risk maneuver strategies may include the traffic lane stop strategy and the load shoulders stop strategy.

The traffic lane stop strategy may include straight stop and in-lane stop, while the road shoulders stop strategy may include half-shoulder stop and full-shoulder stop.

Straight stop is a type of stopping where only longitudinal deceleration control is used, and no lateral control is involved. For example, a straight stop may be performed in situations where lane detection is not possible or where lateral control is not possible due to a fault in the actuators. During a straight stop, acceleration control and lane change are prohibited or impossible, and detecting potential stopping positions outside the lane may be unnecessary. A function of detecting potential stopping locations outside traffic lane may refer to a function of detecting the positions of safe areas located outside traffic lanes, such as shoulders or rest areas.

In-lane stop is a type of stopping where the vehicle comes to a stop within the boundaries of the lane the vehicle was traveling in. For example, an in-lane stop may refer to a type of stopping where the vehicle halts within the boundaries of the lane the vehicle was driving in using lateral control and/or deceleration control. The lane the vehicle was driving in may refer to the lane the vehicle was traveling in at the point when the need for minimal risk maneuvering is determined. During an in-lane stop, acceleration control and lane change are prohibited, and the lane-outside potential stopping position detection function may be unnecessary.

Half-shoulder stop is a type of stopping where the vehicle comes to a stop with part of the vehicle on the shoulder of the road, while full-shoulder stop is a type of stopping where the entire vehicle comes to a stop on the shoulder of the road. During both half-shoulder and full-shoulder stops, lateral control, deceleration control, lane change, and lane-outside potential stopping position detection functions the lane may be used, and acceleration control may be employed only to maintain the current speed.

With reference to FIG. 2, in the HMCS active state 230, if the conditions for handover of vehicle control to the user are met, the processor 130 may display a message or notification to the user to resume the dynamic driving task (DDT) through various methods, as denoted by reference numeral 237. The processor 130 may transition from the HMCS active state 230 to the HMCS standby state 220 if the user resumes the DDT.

Currently, standards for HMCS-related technologies are still in the early development stages, and there are no established norms for displaying notifications to the user as denoted by reference number 237. However, in Level 4 autonomous driving, users are likely to engage in activities unrelated to vehicle operation, and the time taken for users to perceive the notification and resume the DDT may be significantly longer compared to Level 1 to 3 autonomous driving. Therefore, this document proposes a method for displaying notifications to ensure that users can perceive and respond to the control handover request within the necessary response time.

Figure 3:
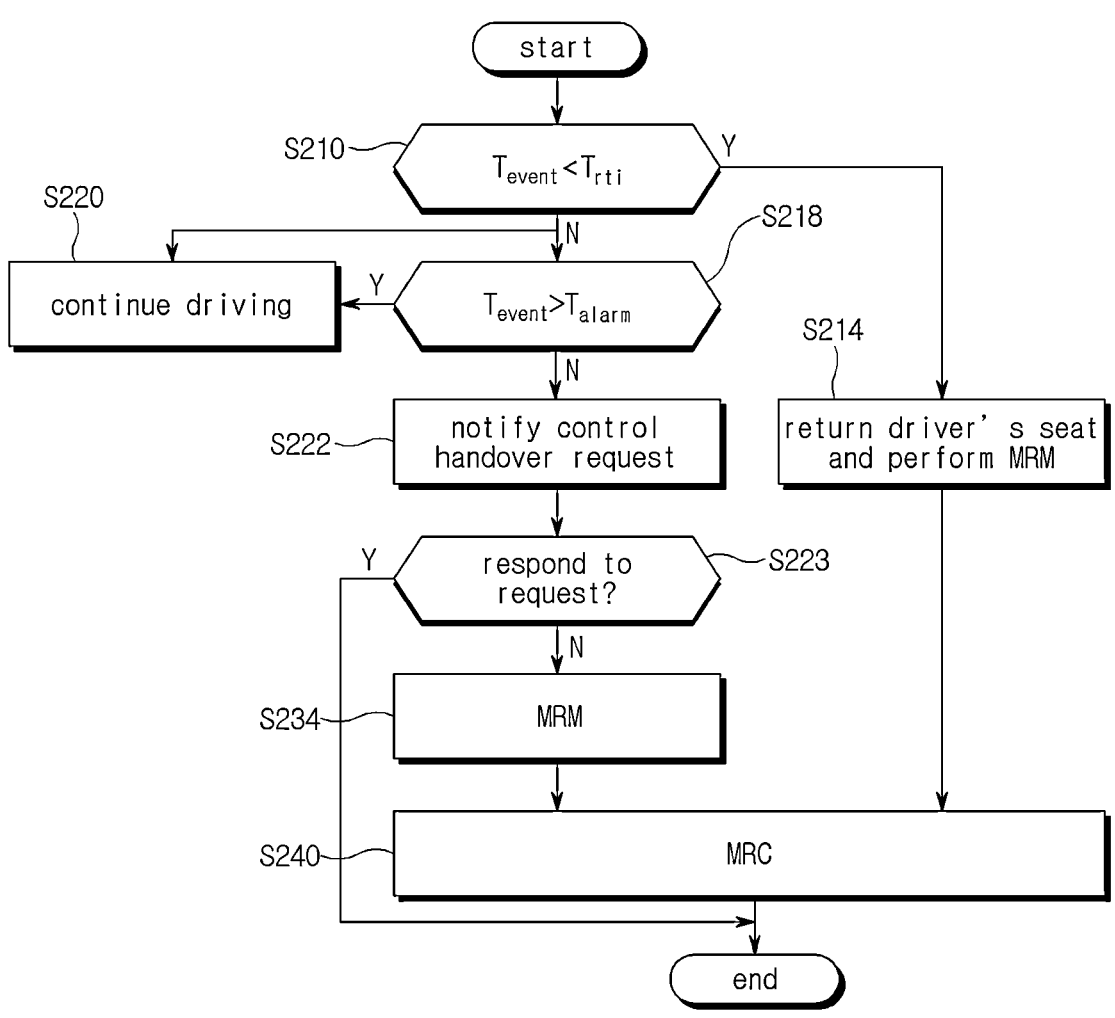
FIG. 3 is a flowchart illustrating an example operation of displaying a control handover request notification based on urgency in an autonomous driving system.

FIG. 3 is a flowchart illustrating the operation of displaying a control handover request notification based on urgency (e.g., in a Level 4 autonomous driving system or other advanced autonomous driving systems).

With reference to FIG. 3, in operation S210, upon recognizing that an event (e.g., a probable collision with a vehicle in front) will occur, the processor 130 may determine whether the event is an urgent event or a non-urgent event. If the event occurrence remaining time ($T_{event}$), which is the remaining time until the event occurs, is shorter than the minimum response time ($T_{rti}$), which is the minimum estimated time required for the user to perceive the current vehicle state and surrounding traffic and resume the DDT, the processor 130 may consider the event as an urgent event; when the event occurrence remaining time ($T_{event}$) is longer than the minimum response time ($T_{rti}$), the processor 130 may consider the event as a non-urgent event.

In particular, the event may be one that requires the handover of control from the autonomous driving system to the user. The event may include situations where the ODD boundary is uncertain but there is a potential for ODD deviation, such as planned ODD boundary approach events, sudden ODD boundary approach or deviation events, and changes in lighting conditions, rainfall, or snowfall. The event may also include situations where a minor malfunction does not yet require the execution of MRM but has the potential to degrade or worsen performance, or situations where a severe malfunction necessitates the execution of MRM. Even if the autonomous driving system performs an MRM without user intervention and the vehicle reaches an MRC state, if the vehicle can still be driven by the user, this may be considered an event requiring control handover. The event may include situations where the user engages in non-driving related activities beyond the permissible limits of the autonomous driving system, such as falling into a deep sleep, or user conditions that make driving impossible, like cardiac arrest or intoxication.

Among the aforementioned events, sudden ODD boundary approach or deviation events, events where a severe malfunction necessitates MRM execution, events indicating a user's unresolvable condition during driving such as cardiac arrest or intoxication, and events where the autonomous driving system performs MRM without user intervention and the vehicle reaches an MRC state may be considered urgent events, whereas planned ODD boundary approach events, events where the ODD boundary is uncertain but there is a risk of ODD deviation, events where a minor malfunction does not yet require MRM but has the potential to degrade or worsen performance, and events where the user engages in non-driving-related activities within permissible limits, such as deep sleep, may be considered non-urgent events.

In operation S210, upon determining that an urgent event has occurred, the processor 130 may proceed to operation S214 to perform a minimal risk maneuver (MRM) while moving at least the driver's seat to a position predefined by the user. In operation S214, the processor 130 may move not only the driver's seat but also all seats in the vehicle to positions predefined by the user.

In the case of an urgent event, as the processor 130 performs the MRM in operation S214, the vehicle 100 may transition to the minimal risk condition (MRC) state in operation S240.

Upon determining in operation S210 that an urgent event has not occurred, the processor 130 may proceed to operation S218 to determine whether the event occurrence remaining time ($T_{event}$) is longer than the alarm time ($T_{alarm}$). Here, the alarm time ($T_{alarm}$) may be a value calculated by adding, to the minimum response time ($T_{rti}$), the vehicle state change time required to bring the vehicle to a user-drivable state based on the vehicle state and the additional buffer time ($T_{driver}$) required until the user can perform driving operations based on the user state detected by the user state detection unit 111. The user state may include information about whether the user is asleep and gaze information. In detail, when the user is in a sleep state, the buffer time may be considerably longer, and the buffer time may increase further when the user's gaze is not directed forward.

The vehicle state change time may include the seat adjustment time ($T_{seat}$) and/or the operation interface adjustment time. The seat adjustment time ($T_{seat}$) may refer to the time required to adjust the driver's seat from the state it was in while the user was not engaged in driving to a state that allows the user to drive. Here, the state of the driver's seat that allows the user to drive may be the state the seat was in when the user was in control of the vehicle before the autonomous driving system took control. Therefore, the adjustment of the driver's seat state includes not only two-dimensional and three-dimensional positional changes in the seat's up, down, left, right, front, and back directions, but also changes in the seat's rotation angle (where the angle is set to zero when the seat is adjusted for the user to drive) and changes in the backrest tilt, encompassing all alterations from the seat's state set for driving.

The operation interface adjustment time may refer to the time required to transition the operation interface, such as the steering wheel, from a state the steering wheel was in while the user was not engaged in driving to a state that allows the user to drive. In an example, this time may also refer to the duration required to extend or deploy the operation interface, which was retracted during autonomous driving, to a position where the user can access and utilize it for driving. In some implementations, even if not being retracted, the operation interface may be in a different orientation or have undergone changes in its two-dimensional or three-dimensional position, such as moving up, down, left, right, forward, or backward, and in this case, the operation interface adjustment time refers to the time required to transition the operation interface from this altered state to a state where the user can access and utilize the operation interface for driving. The seat adjustment time and operation interface adjustment time may increase as the changes in the seat and operating interface deviate further from the normal state that allows the user to drive the vehicle.

If the adjustment of the operation interface and seat occurs simultaneously, the longer duration between the operation interface adjustment time and seat adjustment time ($T_{heat}$) may be considered as the vehicle state change time. If the operation interface adjustment and seat adjustment are performed sequentially, the vehicle state change time may be determined by adding the seat adjustment time ($T_{heat}$) and the operation interface adjustment time.

In operation S218, if the event occurrence remaining time ($T_{event}$) is longer than the alarm time ($T_{alarm}$), the processor 130 may proceed to operation S220 to continue driving the vehicle based on the level 4 autonomous driving method (e.g., HMCS) without displaying a notification to the user. Meanwhile, the processor 130 may continuously determine whether the event occurrence remaining time ($T_{event}$) is still longer than the alarm time ($T_{alarm}$) in operation S218.

In operation S218, if the event occurrence remaining time ($T_{event}$) becomes shorter than the alarm time ($T_{alarm}$), the processor 130 may proceed to operation S222 to display a stage 1 control handover request notification to the user. For example, a processor 130, performing Level 4 autonomous driving such as HMCS, may provide a control handover request notification to the user as early as the alarm time ($T_{alarm}$) before the event is expected to occur.

After displaying the notification, the processor 130 may determine (e.g., in operation S223) whether the user responds to the handover request. When the user's response to the handover request is deemed sufficient, the processor 130 may terminate both the notification display and the Level 4 autonomous driving operation.

After the control hand over request notification is displayed, when the user does not respond to the control handover request, or the response is deemed insufficient (e.g., in operation S223), the processor 130 may proceed to operation S234 to perform a minimal risk maneuver (MRM). As the processor 130 performs the minimal risk maneuver (MRM) (e.g., in operation S234), the vehicle 100 may transition to the minimal risk condition (MRC) state (e.g., in operation S240).

Once the vehicle 100 transitions to the minimal risk condition (MRC) state through the minimal risk maneuver (MRM), the processor 130 may terminate both the notification display and the Level 4 autonomous driving operation.

Figure 4:
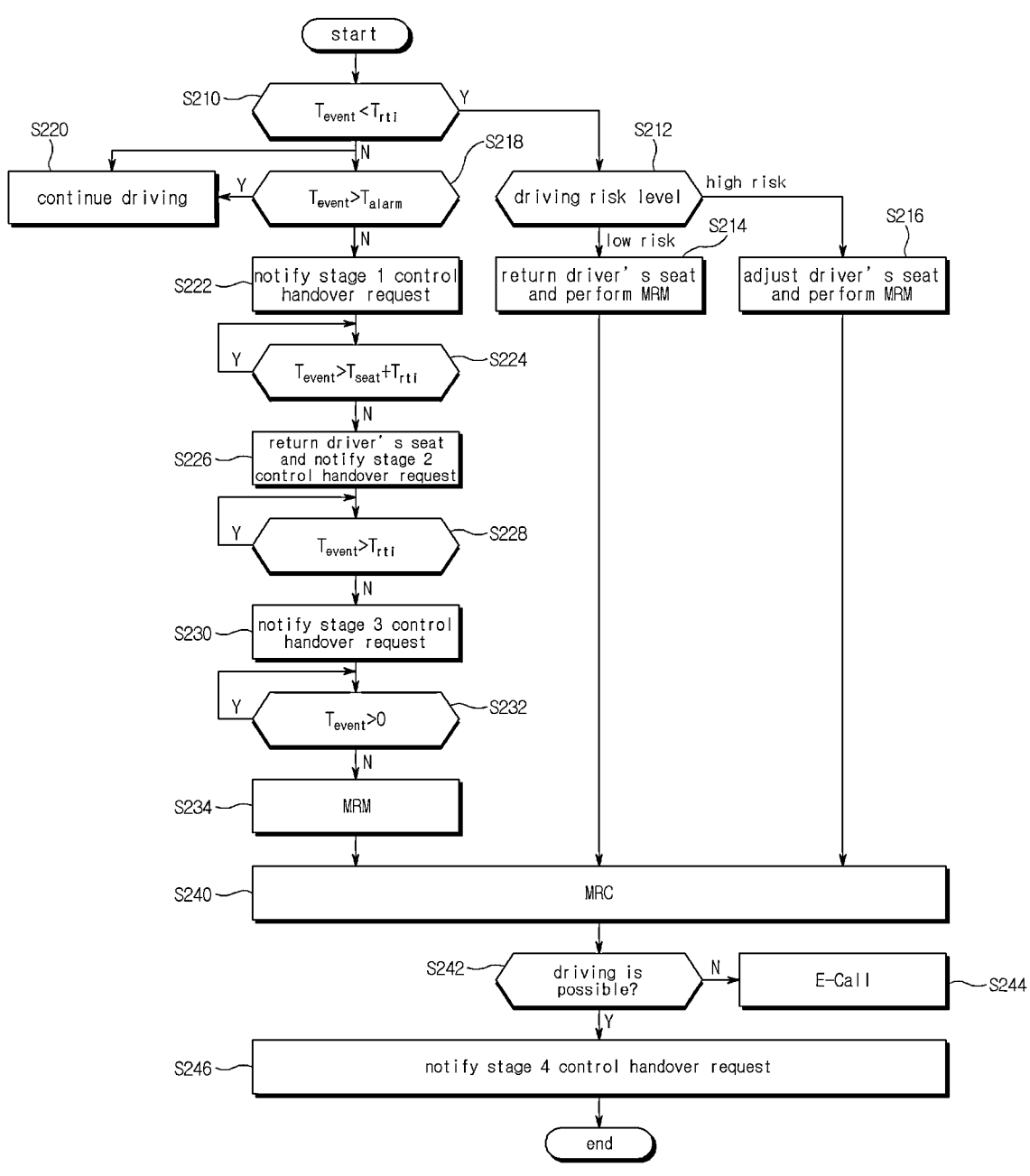
FIG. 4 is a flowchart illustrating an operation of displaying multi-stage notifications based on urgency and user response in an autonomous driving system.

FIG. 4 is a flowchart illustrating the operation of displaying multi-stage notifications based on urgency and user response (e.g., in a Level 4 autonomous driving system).

FIG. 4 illustrates an expanded version of the method depicted in FIG. 3, with operations denoted by the same reference numbers performing the same functions. Additionally, FIG. 4 presents several example extension options based on the method of FIG. 3, and some or all of the proposed extension options may be applied.

With reference to FIG. 4, upon recognizing in operation S210 that an event (e.g., collision with a vehicle in front) will occur, the processor 130 may determine whether the event is an urgent event or a non-urgent event. In an example, if the event occurrence remaining time ($T_{event}$), which is the remaining time until the event occurs, is shorter than the minimum response time ($T_{ri}$), which is the minimum estimated time required for the user to perceive the current vehicle state and surrounding traffic and resume the DDT, the processor 130 may consider the event as an urgent event. If the event occurrence remaining time ($T_{event}$) is longer than the minimum response time ($T_{ri}$), the processor 130 may consider the event as a non-urgent event.

In particular, the event may be one that requires the handover of control from the autonomous driving system to the user. The event may include situations where the ODD boundary is uncertain but there is a potential for ODD deviation, such as planned ODD boundary approach events, sudden ODD boundary approach or deviation events, and changes in lighting conditions, rainfall, or snowfall. The event may also include situations where a minor malfunction does not yet require the execution of MRM but has the potential to degrade or worsen performance, or situations where a severe malfunction necessitates the execution of MRM. In some implementations, even if the autonomous driving system performs an MRM without user intervention and the vehicle reaches an MRC state, if the vehicle can still be driven by the user, this may be considered an event requiring control handover. The event may include situations where the user engages in non-driving related activities beyond the permissible limits of the autonomous driving system, such as falling into a deep sleep, or user conditions that make driving impossible, like cardiac arrest or intoxication.

Among the aforementioned events, sudden ODD boundary approach or deviation events, events where a severe malfunction necessitates MRM execution, events indicating a user's unresolvable condition during driving such as cardiac arrest or intoxication, and events where the autonomous driving system performs MRM without user intervention and the vehicle reaches an MRC state may be considered urgent events, whereas planned ODD boundary approach events, events where the ODD boundary is uncertain but there is a risk of ODD deviation, events where a minor malfunction does not yet require MRM but has the potential to degrade or worsen performance, and events where the user engages in non-driving-related activities within permissible limits, such as deep sleep, may be considered non-urgent events.

Upon determining in operation S210 that an urgent event has occurred, the processor 130 may proceed to operation S212 to determine the driving risk level. The driving risk level may be determined based on at least one of braking deceleration used during minimal risk maneuvers (MRM), steering torque, steering rate of change, expected vehicle yaw-rate change, vehicle stability, or risk level assessment values provided by the autonomous driving system.

Upon determining in operation S212 that the driving risk level is low or the driving risk level has a lower value than a pre-determined value, the processor 130 may proceed to operation S214 to perform a minimal risk maneuver (MRM) while moving the driver's seat to a position preset by the user.

Upon determining in operation S212 that the driving risk level is high or the driving risk level has a higher value than or equal to the pre-determined value, the processor 130 may proceed to operation S216 to respond to the emergency event by adjusting the driver's seat to a position that protects the user and/or passengers in the event of a collision, while also performing a minimal risk maneuver (MRM). For example, the processor 130 may adjust the seat to a position that minimizes injury during a collision, taking into account the user's physical information obtained from the user state detection unit 111, the position of the airbags, and the current seat position.

In the case of an urgent event, as the processor 130 performs the MRM in operation S214 or S216, the vehicle 100 may transition to the minimal risk condition (MRC) state in operation S240.

Upon determining in operation S210 that an urgent event has not occurred, the processor 130 may proceed to operation S218 to determine whether the event occurrence remaining time ($T_{event}$) is longer than the alarm time ($T_{alarm}$). The alarm time ($T_{alarm}$) may be determined based on the user state and/or the vehicle state.

The alarm time ($T_{alarm}$) may be a value calculated by adding, to the minimum response time ($T_{rti}$), the vehicle state change time required to bring the vehicle to a user-drivable state based on the vehicle state and the additional buffer time ($T_{driver}$) required until the user can perform driving operations based on the user state detected by the user state detection unit 111. The user state may include information about whether the user is asleep and gaze information. In an example, if the user is in a sleep state, the buffer time may be considerably longer, and the buffer time may increase further when the user's gaze is not directed forward.

The vehicle state change time may include the seat adjustment time ($T_{heat}$) and/or the operation interface adjustment time. The seat adjustment time ($T_{heat}$) may refer to the time required to adjust the driver's seat from the state it was in while the user was not engaged in driving to a state that allows the user to drive. The state of the driver's seat that allows the user to drive may be the state the seat was in when the user was in control of the vehicle before the autonomous driving system took control. Therefore, the adjustment of the driver's seat state includes not only two-dimensional and three-dimensional positional changes in the seat's up, down, left, right, front, and back directions, but also changes in the seat's rotation angle (where the angle is set to zero when the seat is adjusted for the user to drive) and changes in the backrest tilt, encompassing all alterations from the seat's state set for driving.

The operation interface adjustment time may refer to the time required to transition the operation interface, such as the steering wheel, from a state the steering wheel was in while the user was not engaged in driving to a state that allows the user to drive. This time may also refer to the duration required to extend or deploy the operation interface, which was retracted during autonomous driving, to a position where the user can access and utilize it for driving. Even if being not retracted, the operation interface may be in a different orientation or have undergone changes in its two-dimensional or three-dimensional position, such as moving up, down, left, right, forward, or backward, and in this case, the operation interface adjustment time refers to the time required to transition the operation interface from this altered state to a state where the user can access and utilize the operation interface for driving. The seat adjustment time and operation interface adjustment time may increase as the changes in the seat and operating interface deviate further from the normal state that allows the user to drive the vehicle.

If the adjustment of the operation interface and seat occurs simultaneously, the longer duration between the operation interface adjustment time and seat adjustment time ($T_{heat}$) may be considered as the vehicle state change time. If the operation interface adjustment and seat adjustment are performed sequentially, the vehicle state change time may be determined by adding the seat adjustment time ($T_{heat}$) and the operation interface adjustment time.

In operation S218, if the event occurrence remaining time ($T_{event}$) is longer than the alarm time ($T_{alarm}$), the processor 130 may proceed to operation S220 to continue driving the vehicle based on the level 4 autonomous driving method (e.g., HMCS) without displaying a notification to the user. Meanwhile, the processor 130 may continuously determine whether the event occurrence remaining time ($T_{event}$) is still longer than the alarm time (Talan) in operation S218.

In operation S218, if the event occurrence remaining time ($T_{event}$) becomes shorter than the alarm time ($T_{alarm}$), the processor 130 may proceed to operation S222 to display a stage 1 control handover request notification to the user. For example, a processor 130 performing Level 4 autonomous driving, such as HMCS, may provide an initial handover request notification to the user as early as the alarm time ($T_{alarm}$) before the event is expected to occur.

After displaying the initial notification, the processor 130 may proceed to operation S224 to determine whether the event occurrence remaining time ($T_{event}$) is less than the sum of the minimum response time ($T_{rti}$) and the seat adjustment time ($T_{heat}$). The processor 130 may monitor in operation S224 until the event occurrence remaining time ($T_{event}$) is less than the sum of the minimum response time ($T_{rti}$) and the seat adjustment time ($T_{heat}$), and upon the event occurrence remaining time ($T_{event}$) becoming less than the sum of the minimum response time ($T_{rti}$) and the seat adjustment time ($T_{heat}$), proceed to operation S226 to display a stage 2 control handover request notification to the user while moving the driver's seat to a position predefined by the user.

In operation S228, the processor 130 may determine whether the event occurrence remaining time ($T_{event}$) is greater than the minimum response time (Tr). With reference to operations S224 and S226, in operation S228, the processor 130 may wait for the time required for the driver's seat to be adjusted to a position predefined by the user. Therefore, in operation S228, the processor 130 may also determine whether the driver's seat is in the position predefined by the user.

Upon determining in operation S228 that the event occurrence remaining time ($T_{event}$) is less than the minimum response time ($T_{rt}$), the processor 130 may proceed to operation S230 to display a stage 3 control handover request notification.

After displaying the stage 3 control handover request notification, the processor 130 may proceed to operation S232 to determine whether the event occurrence remaining time ($T_{event}$) is less than or equal to zero. Upon determining in operation S232 that the event occurrence remaining time ($T_{event}$) is less than or equal to zero, the processor 130 may proceed to operation S234 to perform a minimal risk maneuver (MRM). As the processor 130 performs the minimal risk maneuver (MRM) in operation S234, the vehicle 100 may transition to the minimal risk condition (MRC) state in operation S240.

If the processor 130 determines in operation S228 that the event occurrence remaining time ($T_{event}$) is less than the minimum response time ($T_{rt}$), indicating a possible inability to respond to the event, the processor 130 may display a stage 3 control handover request notification in operation S230 and immediately proceed to operation S234 to perform a minimal risk maneuver (MRM).

Once the vehicle 100 transitions to the minimal risk condition (MRC) state through the minimal risk maneuver (MRM), the processor 130 may determine in operation S242 whether the vehicle is capable of continuing to drive. For example, the processor 130 may use information obtained from the sensor unit 110 to determine whether the vehicle is capable of only manual driving, both manual driving and autonomous driving, or is incapable of even manual driving.

Upon determining in operation S242 that even manual driving by the user is not possible, the processor 130 may proceed to operation S244 to request assistance through an emergency rescue system (e.g., E-call).

Upon determining in operation S243 that either manual or autonomous driving is possible, the processor 130 may proceed to operation S246 to display a stage 4 control handover request notification. In this case, when the driver's seat is not in the state predefined by the user, the processor 130 may adjust the driver's seat to the state predefined by the user as a part of handling high-risk emergency events.

If the control handover is not completed within a predefined time after the stage 4 control handover request notification, the processor 130 may request external assistance through an emergency rescue system (e.g., E-call).

According to the flowchart of FIG. 4, a system or processor 130 performing Level 4 autonomous driving goes through a total of four stages for non-urgent events, providing different alarms at each stage, and may, as needed, perform controls related to changing the driver's seat to a drivable state, extending/activating the operation interface, and other related adjustments.

The processor 130 may display increasingly intense notifications for control handover as the stage progresses from stage 1 to stage 4, as shown in FIG. 4.

For example, a stage 1 notification may use one or more types of outputs-visual, auditory, and tactile—to provide information about the occurrence and type of the event and the information necessary for control handover. A stage 2 notification may use two or more types of outputs—visual, auditory, and tactile—to provide information about the occurrence and type of the event and the information necessary for control handover, while also adjusting the driver's seat to a position that allows the user to drive, which was the state before the Level 4 autonomous driving system took over, or, when the user's control interface has been displaced, returning it to its original position. A stage 3 notification may use all methods of visual, auditory, and tactile outputs to provide information about the occurrence and type of the event and the information necessary for control handover. A stage 4 notification may provide information with the same intensity as a stage 3 notification or with a stronger intensity than a stage 3 notification.

If the user takes control during the operations according to the flowchart of FIG. 4, the procedure may immediately terminate, and the method shown in FIG. 4 may also be concluded.

According to various aspects of the present disclosure, a vehicle with autonomous driving capabilities may comprise at least one sensor configured to detect external environment of the vehicle, state of the vehicle, and state of a user, a processor configured to execute autonomous driving of the vehicle based on information obtained through the at least one sensor, and a controller configured to control the operation of the vehicle under the control of the processor, wherein the processor may determine whether the control of the vehicle needs to be handed over to the user based on an event occurring during autonomous driving of the vehicle, and provide the user with a notification indicating that the control of the vehicle needs to be handed over to the user, the notification being provided through multiple stages.

The processor may detect an upcoming event, determine whether the control needs to be handed over based on the event, acquire an event occurrence remaining time until the event occurs when the control needs to be handed over, determine whether the event occurrence remaining time is greater than or equal to a first time, determine whether the event occurrence remaining time is greater than a second time when the event occurrence remaining time is greater than or equal to the first time, continue autonomous driving when the event occurrence remaining time is greater than the second time, and display a first-stage notification for control handover request when the event occurrence remaining time is less than the second time, wherein the second time is determined based on at least one of the state of the user and the state of the vehicle.

The second time may be calculated by adding, to the first time, a vehicle state change time needed to bring the vehicle to a state where the user is able to drive the vehicle based on the state of the vehicle, and buffer time required for the user to perform a driving operation based on the state of the user.

The buffer time may be configured to increase user's gaze deviates further from forward direction, and the vehicle state change time may be configured to increase as the seat or driving operation interface deviates more from a normal state allowing the user to drive the vehicle.

The processor may execute a minimal risk maneuver to transition the vehicle to a minimal risk condition state based on the event occurrence remaining time being less than the first time.

The processor may calculate a driving risk level of the vehicle based on the event occurrence remaining time being less than the first time, move the driver's seat to a state predefined by the user based on the driving risk level being determined as low risk, and move the driver's seat to a state capable of protecting the user based on the driving risk level being determined as high risk.

The processor may display a second-stage notification for control handover request based on the event occurrence remaining time being less than a third time, and display a third-stage notification for control handover request based on the event occurrence remaining time being less than a fourth time, the first time and the fourth time being the same, the third time being longer than the fourth time, the second time being longer than the third time.

The processor may execute a minimal risk maneuver driving after fifth time since displaying the third-stage notification to transition the vehicle to a minimal risk condition state.

The first time and the fourth time are minimum expected time required for the user to recognize the current state of the vehicle and surrounding traffic and be able to drive the vehicle, and the third time is the time obtained by subtracting the buffer time from the second time.

The processor may move the driver's seat to the state predefined by the user while displaying the second-stage notification.

The vehicle state change time may comprise at least one of a seat adjustment time required to adjust the driver's seat from an altered state in which the user was not engaged in driving to a state that allows the user to drive, and an operation interface adjustment time required to adjust the operation interface to a state that allows the user to use.

According to various aspects of the present disclosure, a method for operating a vehicle with autonomous driving capabilities may comprise determining whether the control of the vehicle needs to be handed over to a user based on an event occurring during autonomous driving of the vehicle, and providing the user with a notification indicating that the control of the vehicle needs to be handed over to the user, the notification being provided through multiple stages.

The determining of whether the control of the vehicle needs to be handed over may comprise detecting an upcoming event and determining whether the control needs to be handed over based on the event, and the providing the user with a notification may comprise acquiring an event occurrence remaining time until the event occurs when the control needs to be handed over, determining whether the event occurrence remaining time is greater than or equal to a first time, determining whether the event occurrence remaining time is greater than a second time when the event occurrence remaining time is greater than or equal to the first time, continuing autonomous driving based on the event occurrence remaining time being greater than the second time, and displaying a first-stage notification for control handover request based on the event occurrence remaining time being less than the second time, wherein the second time is determined based on at least one of the state of the user and the state of the vehicle.

The second time may be calculated by adding, to the first time, a vehicle state change time needed to bring the vehicle to a state where the user is able to drive the vehicle based on the state of the vehicle, and the buffer time required for the user to perform a driving operation based on the state of the user.

The state of the user may comprise gaze information and information on whether the user is asleep, and the state of the vehicle may include at least one of seat state information and driving operation interface state information.

The buffer time may be configured to increase user's gaze deviates further from forward direction, and the vehicle state change time may be configured to increase as the seat or driving operation interface deviates more from a normal state allowing the user to drive the vehicle.

The providing the user with a notification may comprise executing a minimal risk maneuver to transition the vehicle to a minimal risk condition state based on the event occurrence remaining time being less than the first time.

The providing the user with a notification may comprise calculating a driving risk level of the vehicle based on the event occurrence remaining time being less than the first time, moving the driver's seat to a state predefined by the user based on the driving risk level being determined as low risk, and moving the driver's seat to a state capable of protecting the user based on the driving risk level being determined as high risk.

The providing the user with a notification may comprise displaying a second-stage notification for control handover request based on the event occurrence remaining time being less than a third time, and displaying a third-stage notification for control handover request based on the event occurrence remaining time being less than a fourth time, wherein the first time and the fourth time are the same, the third time is longer than the fourth time, and the second time is longer than the third time.

The first time and the fourth time are minimum expected time required for the user to recognize the current state of the vehicle and surrounding traffic and be able to drive the vehicle, and the third time is the time obtained by subtracting the buffer time from the second time.

The providing of the notification may include moving the driver's seat to the state predefined by the user while displaying the second-stage notification.

The vehicle state change time may include at least one of a seat adjustment time required to adjust the driver's seat from an altered state in which the user was not engaged in driving to a state that allows the user to drive, and an operation interface adjustment time required to adjust the operation interface to a state that allows the user to use.

As described above, various examples relate to a method for providing notifications to a user when the user is required to take control of the vehicle in Level 4 autonomous driving. Since the user may not be involved in driving at all when Level 4 autonomous driving, which is a highly advanced autonomous driving, the user is likely to be paying attention to something other than driving the vehicle. Therefore, there is a high probability that the user may not be aware of or respond immediately to the vehicle control handover notification sent from the Level 4 autonomous driving system. In this situation, various features proposed in this document suggest a method for providing notifications in stages from Stage 1 to Stage 4, considering the user's situation during Level 4 autonomous driving.

According to various features of this document, it is advantageous to prevent accidents and increase the system reliability by handling inevitable control handover events in a Level 4 autonomous system situationally rather than uniformly.

What is claimed is:

1. A vehicle with autonomous driving capabilities, the vehicle comprising:

at least one sensor configured to detect external environment of the vehicle, a state of the vehicle, and a state of a user;

a processor configured to execute autonomous driving of the vehicle based on information obtained via the at least one sensor; and a controller configured to control, based on a control of the processor, an operation of the vehicle, wherein the processor is configured to:

determine whether control of the vehicle needs to be handed over to the user based on an event occurring during autonomous driving of the vehicle, generate, based on the state of the user and based on an indication associated with urgency of the event, a notification indicating that the control of the vehicle needs to be handed over to the user, and output the generated notification to the user, and wherein the processor is further configured to:

detect the event, determine an event occurrence remaining time until the event occurs, determine whether the event occurrence remaining time is less than a first time, and execute, based on the event occurrence remaining time being less than the first time, a minimal risk maneuver to transition the vehicle to a minimal risk condition state.

2. The vehicle of claim 1, wherein the processor is further configured to:

determine whether the event occurrence remaining time is greater than or equal to the first time, determine whether the event occurrence remaining time is greater than a second time, based on the event occurrence remaining time being greater than or equal to the first time, and continue autonomous driving, based on the event occurrence remaining time being greater than the second time, or display a first-stage notification for control handover request, based on the event occurrence remaining time being less than the second time, wherein the second time is determined based on at least one of the state of the user or the state of the vehicle.

3. The vehicle of claim 2, wherein the second time is determined by adding, to the first time, a vehicle state change time needed to bring the vehicle to a state where the user is able to drive the vehicle based on the state of the vehicle and a buffer time required for the user to perform a driving operation based on the state of the user.

4. The vehicle of claim 3, wherein the state of the user is determined based on gaze information and information on whether the user is asleep, and wherein the state of the vehicle is based on at least one of state information of a driver seat of the vehicle or state information of a driving operation interface.

5. The vehicle of claim 4, wherein the buffer time is configured to increase as user's gaze deviates further from a forward direction, and wherein the vehicle state change time is configured to increase as the driver seat or the driving operation interface deviates more from a normal state allowing the user to drive the vehicle.

6. The vehicle of claim 1, wherein the processor is further configured to:

determine, based on the event occurrence remaining time being less than the first time, a value indicating a driving risk level of the vehicle, move, based on the driving risk level being less than a risk threshold, a driver seat of the vehicle to a state preset by the user, and move, based on the driving risk level being greater than the risk threshold, the driver seat to a state capable of protecting the user from a collision.

7. The vehicle of claim 3, wherein the processor is configured to:

display a second-stage notification for control handover request based on the event occurrence remaining time being less than a third time, and display a third-stage notification for control handover request based on the event occurrence remaining time being less than a fourth time, wherein the first time and the fourth time are the same, the third time is longer than the fourth time, and the second time is longer than the third time.

8. The vehicle of claim 7, wherein the first time and the fourth time are minimum expected time required for the user to recognize a current state of the vehicle and surrounding traffic and be able to manually drive the vehicle, and the third time is the time obtained by subtracting the buffer time from the second time.

9. The vehicle of claim 7, wherein the processor is configured to move a driver seat of the vehicle to a state preset by the user while displaying the second-stage notification.

10. The vehicle of claim 4, wherein the vehicle state change time comprises at least one of:

a seat adjustment time required to adjust the driver seat from an altered state in which the user was not engaged in driving to a state that allows the user to drive, or an operation interface adjustment time required to adjust the operation interface to a state that allows the user to use.

11. A method for operating a vehicle equipped with autonomous driving capabilities, the method comprising:

determining whether control of the vehicle needs to be handed over to a user of the vehicle based on an event occurring during autonomous driving of the vehicle;

generating, based on a state of the user detected by at least one sensor and based on an indication associated with urgency of the event, a notification indicating that the control of the vehicle needs to be handed over to the user; and outputting the generated notification to the user, wherein the determining of whether the control of the vehicle needs to be handed over comprises:

detecting the event, determining whether the control of the vehicle needs to be handed over based on the event, and wherein the method further comprises:

determining an event occurrence remaining time until the event occurs, determining whether the event occurrence remaining time is less than a first time, and executing, based on the event occurrence remaining time being less than the first time, a minimal risk maneuver to transition the vehicle to a minimal risk condition state.

12. The method of claim 11, further comprising:

determining whether a second event occurrence remaining time is greater than or equal to the first time, determining whether the event second occurrence remaining time is greater than a second time, based on the second event occurrence remaining time being greater than or equal to the first time, and continuing autonomous driving, based on the second event occurrence remaining time being greater than the second time, or displaying a first-stage notification for control handover request, based on the second event occurrence remaining time being less than the second time, wherein the second time is determined based on at least one of state of the user or state of the vehicle.

13. The method of claim 12, wherein the second time is determined by adding, to the first time, a vehicle state change time needed to bring the vehicle to a state where the user is able to drive the vehicle based on the state of the vehicle and a buffer time required for the user to perform a driving operation based on the state of the user.

14. The method of claim 13, wherein the state of the user is determined based on gaze information and information on whether the user is asleep, and wherein the state of the vehicle is based on at least one of state information of a driver seat of the vehicle or state information of a driving operation interface.

15. The method of claim 14, wherein the buffer time is configured to increase as user's gaze deviates further from a forward direction, and wherein the vehicle state change time is configured to increase as the driver seat or the driving operation interface deviates more from a normal state allowing the user to drive the vehicle.

16. The method of claim 11, further comprising:

determining, based on the event occurrence remaining time being less than the first time, a value indicating a driving risk level of the vehicle; and moving, based on the driving risk level being less than a risk threshold, a driver seat of the vehicle to a state preset by the user; or moving, based on the driving risk level being greater than the risk threshold, the driver seat to a state capable of protecting the user from a collision.

17. The method of claim 13, wherein the outputting of the generated notification comprises:

displaying a second-stage notification for control handover request based on the event occurrence remaining time being less than a third time; and displaying a third-stage notification for control handover request based on the event occurrence remaining time being less than a fourth time, wherein the first time and the fourth time are the same, the third time is longer than the fourth time, and the second time is longer than the third time.

18. The method of claim 17, wherein the first time and the fourth time are minimum expected time required for the user to recognize a current state of the vehicle and surrounding traffic and be able to manually drive the vehicle, and the third time is the time obtained by subtracting the buffer time from the second time.

19. A vehicle comprising:

at least one sensor configured to detect external environment of the vehicle, a state of the vehicle, and a state of a user;

a processor; and a memory storing at least one instruction that is configured to be executed by the processor to cause the vehicle to:

execute, based on the external environment and the state of the vehicle, autonomous driving of the vehicle, determine whether control of the vehicle needs to be handed over to the user based on an upcoming event occurring during autonomous driving of the vehicle, generate, based on an indication associated with urgency of the upcoming event, a notification indicating that the control of the vehicle needs to be handed over to the user, output the generated notification to the user, determine an event occurrence remaining time until the upcoming event occurs, determine whether the event occurrence remaining time is less than a first time, and execute, based on the event occurrence remaining time being less than the first time, a minimal risk maneuver to transition the vehicle to a minimal risk condition state.

20. The vehicle of claim 19, wherein the at least one instruction is configured to be executed by the processor to cause the vehicle to output the generated notification to the user by outputting the generated notification to the user before an occurrence of the upcoming event, and wherein a time duration between the outputting of the generated notification and the occurrence of the upcoming event is based on the state of the user, the state of the vehicle, and the external environment.

* * * * *